United States Patent [19]

Manchak, Jr.

[11] Patent Number: 4,844,839
[45] Date of Patent: Jul. 4, 1989

[54] IN SITU TREATMENT AND ANALYSIS OF WASTES

[76] Inventor: Frank Manchak, Jr., 124 Santa Felecia Dr., Goleta, Calif. 93117-2804

[21] Appl. No.: 167,981

[22] Filed: Mar. 14, 1988

Related U.S. Application Data

[60] Division of Ser. No. 865,745, filed as PCT US85/01656 on Aug. 26, 1985, published as W086/01439 on Mar. 13, 1986, Pat. No. 4,776,409, and a continuation of Ser. No. 646,745, Sep. 4, 1984, abandoned.

[51] Int. Cl.⁴ .......................... G21F 9/12; E21B 7/00; E21B 49/00; E21B 47/00
[52] U.S. Cl. .................................... 252/633; 166/285; 166/289; 166/290; 175/50; 175/57; 175/75; 252/628; 252/630; 252/629; 405/128; 405/129; 405/266; 405/269; 405/131; 405/263; 405/240; 405/241; 73/23; 73/28; 73/29; 73/153
[58] Field of Search ............... 252/628, 630, 631, 629, 252/633, 626; 166/285, 289, 290, 292, 293; 405/266–270, 128, 263, 129, 131, 233, 240, 241, 249; 175/57, 75, 50, 40; 435/262, 267, 264; 106/900, 85; 73/23, 28, 29, 153, 866, 866.5, 432.1

[56] References Cited

U.S. PATENT DOCUMENTS

| 3,023,585 | 3/1962 | Liver | 405/263 |
|---|---|---|---|
| 3,097,492 | 7/1963 | Salassi | 405/269 |
| 3,243,962 | 4/1966 | Ratliff | 405/269 |
| 3,526,279 | 9/1970 | Colburn | 252/633 |
| 3,959,172 | 5/1976 | Brownell et al. | 252/628 |
| 4,056,937 | 11/1977 | Suzuki | 166/292 |
| 4,058,986 | 11/1977 | Granholm | 61/63 |
| 4,063,424 | 12/1977 | Takagi et al. | 61/50 |
| 4,072,017 | 2/1978 | Shiraki | 61/35 |
| 4,084,383 | 4/1978 | Kukino et al. | 61/36 R |
| 4,149,968 | 4/1979 | Kupiec et al. | 405/128 |
| 4,212,565 | 7/1980 | Watabe | 405/269 |
| 4,269,706 | 5/1981 | Sondermann | 210/682 |
| 4,326,842 | 4/1982 | Adachi et al. | 252/626 |
| 4,333,847 | 6/1982 | Tran et al. | 252/629 |
| 4,352,601 | 10/1982 | Valiga et al. | 405/270 |
| 4,362,434 | 12/1982 | Valiga et al. | 405/128 |
| 4,376,598 | 3/1983 | Browns et al. | 405/258 |
| 4,400,314 | 8/1983 | Ellis et al. | 252/633 |
| 4,442,028 | 4/1984 | Wolf et al. | 252/628 |
| 4,456,400 | 6/1984 | Heide et al. | 405/128 |
| 4,483,399 | 11/1984 | Colgate | 166/308 |
| 4,500,227 | 2/1985 | Courtois et al. | 405/128 |
| 4,544,499 | 10/1985 | Tran et al. | 252/629 |
| 4,545,702 | 10/1985 | Sano et al. | 405/269 |
| 4,606,675 | 8/1986 | Mitani et al. | 405/263 |
| 4,652,180 | 3/1987 | Jenkins, Jr. | 405/269 |
| 4,659,259 | 4/1987 | Reed et al. | 405/263 |
| 4,662,792 | 5/1987 | Gessay | 405/233 |
| 4,700,638 | 10/1987 | Przewalski | 110/346 |

FOREIGN PATENT DOCUMENTS

| 2524351 | 10/1983 | France | 405/129 |
|---|---|---|---|
| 2134919 | 8/1984 | United Kingdom | 405/128 |

Primary Examiner—Howard J. Locker
Attorney, Agent, or Firm—Roth & Goldman

[57] ABSTRACT

Hazardous wastes are identified and treated in situ by forming a downwardly extending zone of particles in the waste. Toxic components in the waste are identified by injection of a pressurized fluid into the zone and capturing a sample of gases rising to the surface of the waste. At least one treatment agent is injected into the zone as appropriate until sampling indicates the particles of waste have been treated to a desired degree.

24 Claims, 10 Drawing Sheets

IN SITU TREATMENT AND ANALYSIS OF WASTES

CROSS REFERENCES TO RELATED APPLICATIONS, IF ANY

This Application is a division of my U.S. Application Ser. No. 865,745, filed as PCT US85/01656 on Aug. 26, 1985, published as WO86/01439 on Mar. 13, 1986, now U.S. Pat. No. 4,776,405 being a continuation of U.S. Application Ser. No. 646,745 filed Sept. 4, 1984 and now abandoned.

BACKGROUND OF THE INVENTION

This invention relates generally to treatment of hazardous wastes, and particularly to the in situ analysis of contaminants and treatment of hazardous waste disposal sites.

In various industries it has been common practice to discharge aqueous, dry or semi-solid waste chemicals or radioactive materials into ponds, which waste material after a period of time tends to become pasty or solid due to the evaporation of water therefrom. After the waste material has assumed a substantially solid state, dry particles thereof that are exposed to the ambient atmosphere tend to become airborne and are a health hazard. In addition, the toxic material in such an impoundment tends to leach into the soil adjacent thereto as well as contaminate ground water.

In the past, various methods have been proposed to lessen the danger inherent to such hazardous impounded materials, but such methods have not been effective. One such method includes the removal of a portion of the waste material, and erecting a concrete or betonite isolation wall in an attempt to contain the balance of the impounded material.

Also it has been proposed to excavate the impounded material and transport the same to existing or newly built disposal sites that may or may not be sealed with a liner. However, when either of the above identified methods is used, the impounded material is subjected to mechanical action that renders a portion of it airborne with consequent health hazards.

SUMMARY OF THE INVENTION

A major object of the present invention is to provide an insitu method treating impounded toxic and radioactive materials, and one that transforms the impounded material into a solid substantially insoluble mass from which toxic materials will not leach out into adjoining land or water table, nor will any substantial surface particles of the mass become airborne even when the mass is subjected to elements of weather.

Another object of the invention is to supply a method of treating hazardous impounded materials in such a manner that the danger of transporting the same over public highways is eliminated.

A further object of the invention is to furnish a method of treating hazardous waste material that is more rapid to carry out and less dangerous to the personnel involved than prior art methods that attempted to attain the same results.

A further object of the present invention is to treat an impoundment containing radioactive material to minimize the escape of radon gas therefrom and to render radioactive compounds in the impoundment insoluble to the extent that they will not leach out from the treated impoundment.

The in situ impoundment treating an assembly of adjacently disposed, power driven, rotating cutter-injectors supported on the lower ends of vertically disposed hollow kelly stems or drill pipe that may move up and down. The assembly is supported by a boom or the like that extends outwardly from a power driven vehicle such as a tractor pipelayer crane or the like. The boom supported assembly may be extended out over the impoundment a substantial distance, while the power driven vehicle remains on solid land adjacent the impoundment.

The assembly cutter-injectors are sequentially lowered into adjacent areas or stations of the impoundment while rotating to homogenize the hazardous waste material therein to a desired depth. After the desired depth has been reached, the cutter-injectors are moved upwardly while rotating, and simultaneously treatment chemicals for the hazardous waste material are injected therefrom.

The depth to which the cutter-injectors are moved downwardly and then raised upwardly as above described produce different results. If the cutter-injectors are moved downwardly and then upwardly in only the land beneath the impoundment, an impervious liner to contain the hazardous waste may be formed without removing the hazardous material from the impoundment. By lowering the cutter-injectors to the bottom of the impoundment and the raising them upwardly, the entire contents of the impoundment may be transformed to an inert insoluble mass that has substantial strength, and may remain in place. Should the cutter-injectors be moved downwardly below the surface of the impoundment and then upwardly, a rigid cap of a desired thickness may be placed over the hazardous waste in the impoundment that will bear a substantial load and prevent particles of the hazardous waste becoming airborne.

Released odors or toxic vapors that escape from the hazardous waste material during the treatment thereof, and that are not destructed by the treatment of chemicals, are reeded to the surface of the impoundment and collected for scrubbing within a confined space defined within a protective collection shroud that extends over the treating area.

The multi-head rotating cutter-injectors are so spaced that the circular area through which they rotate overlap to assure complete mixing of the hazardous waste material being treated and the treatment chemicals therewith. Engineering values of the treated material may be predetermined by bench testing representative samples or are taken periodically to determine shear compression, and the load bearing strength of the treated material, and on the basis of these results the rate of injection of the treatment chemicals is varied to obtain treated waste having desired physical characteristics.

The specific treatment chemical used will depend on the composition of the hazardous waste material which is determined by an analysis thereof. Waste materials found in impoundments include cyanide waste; toxic metals; metal plating waste; inorganic compounds that may be acid or base solvents and reactive sludges; pestiside compounds; halogenate and nonhalogenate volatile organics, transformed from oil and the like. Impoundments may also contain drilling muds and fluids; oily waste sludges; pasty sludges; pharmaceutical, agricultural and municiple waste water sludges; and low level radioactive waste and uranium mill tailings.

The specific treatment chemicals selected for use at a particular impoundment can result in aqueous waste being dewatered and the volume thereof accordingly reduced.

Free standing liquids are blended with the solid fraction to eliminate the removal of the liquid phase. Toxic substances in the impoundment are transformed into a stable, inert, insoluble sediment which may be solidified into a nonpermeable matrix. Waste odors or toxic vapors arising during the impoundment treatment are either chemically destroyed, or scrubbed to remove objectionable components prior to being released to the ambient atmosphere.

Impounded hazardous waste are not removed from or surfaced on the impoundment during the present treatment method and exposure of workmen to toxic emitions is minimal or completely eliminated. Aqueous waste immediately after treatment are transformed into a dry, earthlike friable material that may be handled safely and transported by use of conventional earth moving equipment.

The major chemical use in carrying out the insitu treatment to immobilize, detoxify, destroy or precipitate the toxic substances and transform them into an insoluble state as well as into a highly impermeable and dense matrix, includes limes in form of calcium oxide, calcium hydroxide and milk of lime and suitable clay products. Other chemical additives include a wide range of oxidizing additives of which sodium bisulfate, sodium hydrosulfite, chlorine dioxide, hydrogen peroxide, ozone and acids and alkaline products in various forms are examples. Other chemicals dependent on the composition of the waste material.

DESCRIPTION OF THE PREFERRED EMBODIMENTS

Figures 1, 2, 3:
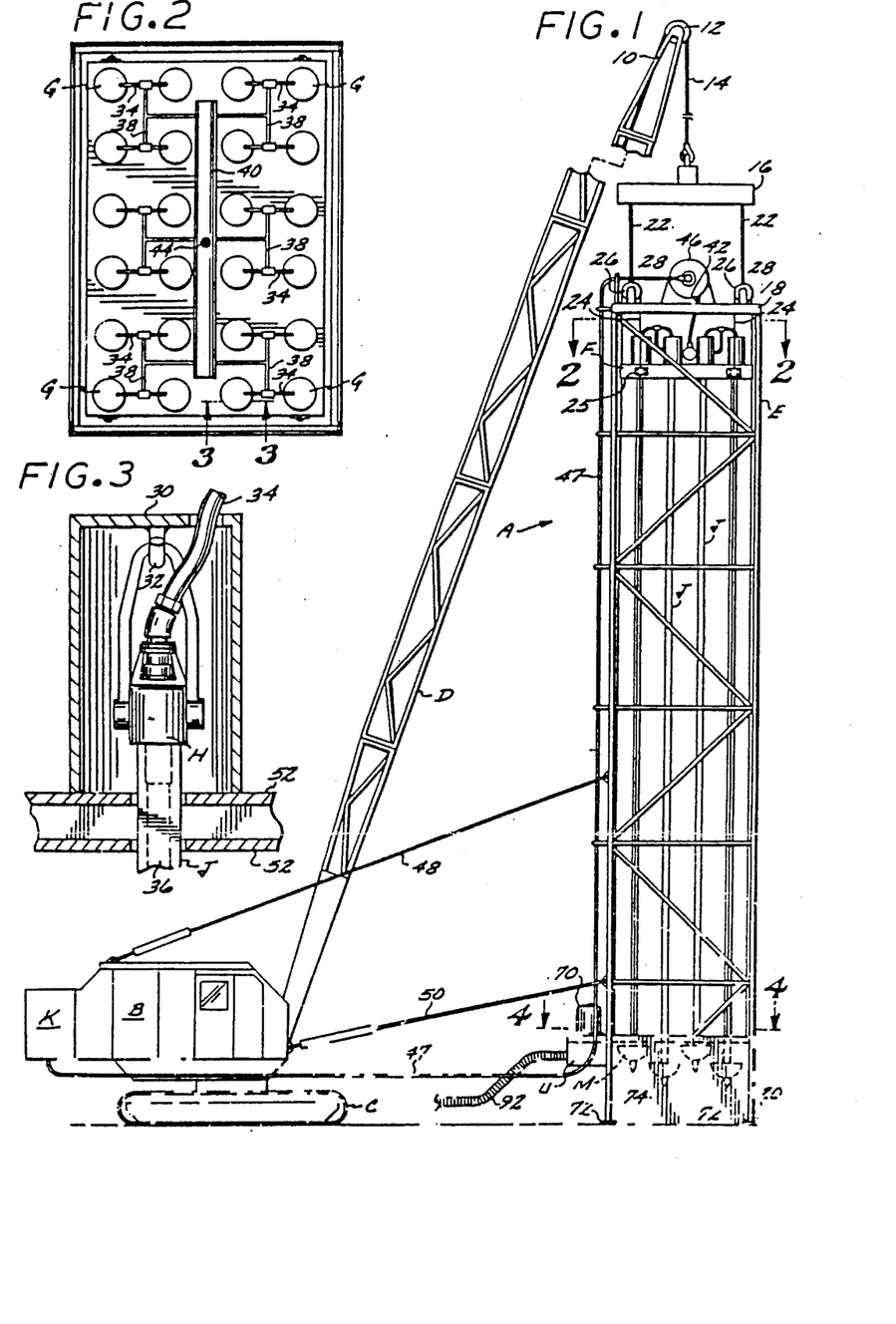
FIG. 1 is a side elevational view of an apparatus for use in the insitu treatment of hazardous waste impoundments.
FIG. 2 is a top plan view of a portion of the apparatus taken on the line 2—2 of FIG. 1.
FIG. 3 is a fragmentary vertical cross sectional view of a swivel assembly taken on the line 3—3 of FIG. 2.

The apparatus A used in carrying out the insitu method of treating hazardous waste impoundment includes a power operated vehicle B that is preferably mounted on caterpillar track C to permit the vehicle to travel over soft ground. A boom D is pivotally supported from the vehicle B and extends upwardly and outwardly therefrom as shown in FIG. 1. The boom D is angularly adjustable relative to the vehicle by conventional means (not shown).

The boom D has an outer end 10 that rotatably supports a pulley 12 over which a winch operated first cable 14 passes to extend downwardly to a support 16. An elongate vertical framework E is provided that has an upper end portion 18 and a lower end portion 20. A number of second cables 22 extend downwardly from the support 16 and are secured to the upper end portion 18 of the framework.

A horizontal vertically movable platform F is disposed within the framework E and is moved upwardly and downwardly by a number of spaced hoist and crown chain belts 24 that engage upper and lower sprockets 26 mounted on the framework E, but with only the upper sprockets being shown. The platform F is secured to one of the reaches of the belts 24 by conventional means 25. The sprockets 26 are secured to shafts (not shown) that are driven by motors 28 as may be seen in FIG. 1.

A number of inverted cup shaped housings G are supported on the platform F as may be seen in FIG. 2 and are arranged in four rows, each of which rows includes four housings. Each housing G includes an upper end 30 from which a hook 32 extends downwardly to support a conventional oil well swivel H.

A number of hollow kelly stems J are provided and have their upper ends rotatably supported by the swivels H as shown in FIG. 3. Each swivel H has a first hose 34 connected thereto as shown in FIG. 3, with the hose being in communication with a passage 36 that extends downwardly in one of the kelly stems J. Each of the hoses 34 is connected to a tubular member assembly 38 that is in communication with an elongate manifold 40.

A second hose 42 is connected to a centered opening 44 in manifold 40, with the second hose extending to a reel 46. Reel 46 is supported on the upper portion of framework E. A third hose 47 extends from reel 46 downwardly alongside framework E to a facility K that serves to store chemicals, chemical blending and proportioning apparatus, a compressor, and pump for discharging dry chemicals and chemical solutions into the third hose 47. This facility is not shown in detail as all of the equipment therein is conventional and may be purchased in the present day commercial equipment market. The vehicle B has stabilizing members 48 and 50 extending therefrom to the framework E.

Figure 4:
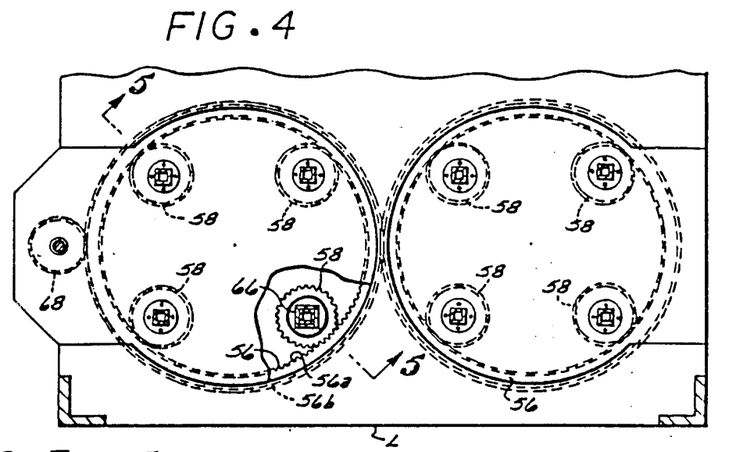
FIG. 4 is a top plan view of a portion of the rotary table floor taken on the line 4—4 of FIG. 1.
Figure 5:
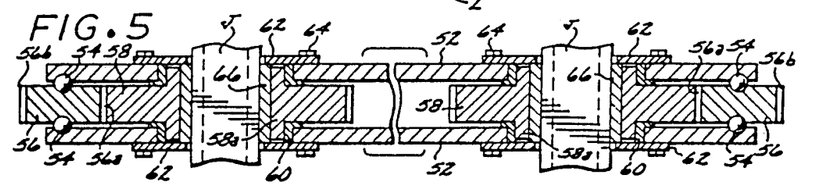
FIG. 5 is a vertical cross sectional view of a portion of the cutter-injector driving mechanism taken on the line 5—5 of FIG. 4.

A rotary table L is mounted on the lower portion of the framework E and as may be seen in FIG. 5 is defined by two parallel, vertically spaced plates 52 that are secured together in fixed relationship by conventional means (not shown). One half of the rotary table is shown in FIG. 4, with the other half being of the same structure. A number of ball bearings 54 engage grooves 56a in a pair of ring gears 56. The ball bearings 54 rotatably support the pair of ring gears 56 between the plates. Ring gears 56 have interior and exterior teeth 56a and 56b. Exterior teeth 56b are in engagement as shown in FIG. 4. Eight sprockets 58 are disposed between the plates 52 and are arranged in two rows of four sprockets each.

Each sprocket 58 includes a hub 58a that is rotatably supported in a bearing 60 that engages the pair of plates 52. The bearings 60 are held in place on the rotary table L by retaining members 62 that are secured to plates 52 by bolts 64.

Each of the hubs 52a has a sleeve 66 extending therethrough, with the sleeve having a passage of square transverse cross section therein that is slidably engaged by one of the hollow kelly stems J that is also of square transverse cross section. A driving gear 68 engages the external threads 56b of one of the ring gears 56 as shown in FIG. 4, with the gears being rotated by a motor 70 shown in FIG. 1. The half of the rotary table L (not shown) in FIG. 4 is of the same structure as that illustrated and is also driven by a second motor (not shown). The framework E has pads 72 secured to the lower portion thereof to permit the framework to be rested and supported on solid ground. A shroud 74 of pliable material extends downwardly from the periphery of the rotary table L as shown in FIG. 1 and is preferably of a length to extend below the pads 74 when the shroud is fully stretched out.

Figures 6, 7, 8, 9, 10:
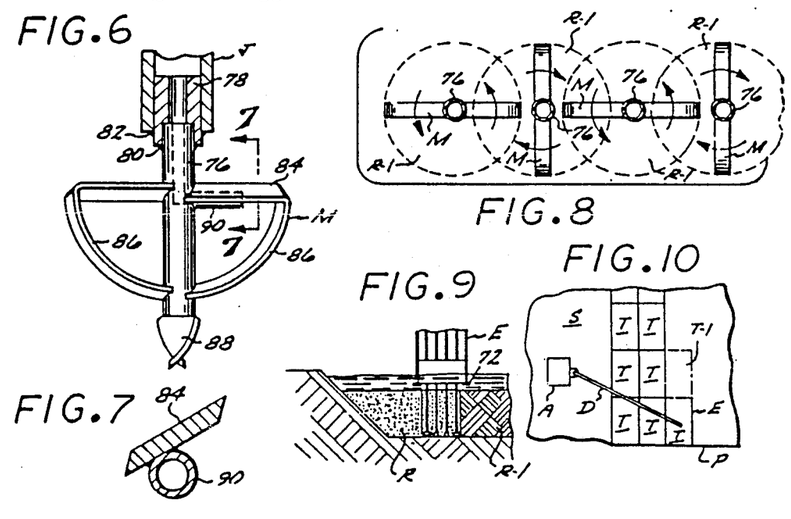
FIG. 6 is a side elevational view of one of the cutter-injectors.
FIG. 7 is a fragmentary vertical cross sectional view of one of the cutter-injectors taken on the line 7—7 of FIG. 6.
FIG. 8 is a top plan view of a portion of the cutter-injector.
FIG. 9 is a side elevational view of the lower portion of the apparatus holding a number adjacently disposed zones thoroughly mixed hazardous waste in an impoundment.
FIG. 10 is a top plan view of the apparatus adjacently disposed to an impoundment and moving the cutter-injector assembly from station to station to insoluablize and render inert the hazardous waste material.

Each kelly stem J supports a cutter-injector M on the lower end thereof, the detail structure of one of the cutter-injectors being shown in FIG. 6. Each cutter-injector M includes a rigid elongate vertically disposable member 76 that has the upper end secured to a tubular collar 70a by welding beads 80, and the collar in turn secures the lower end of a kelly stem J by second welding beads 82.

Two first straight straps 84 of opposite pitch are axially aligned and extend outwardly in opposite directions from the member 76. The straps 84 on the outer ends develop into second straps 86 of arcuate shape that extend downwardly and inwardly to be secured to the member 76. The second straps 86 are also of opposite pitch. The hollow tubular member 76 has a bladed auger 88 secured to the lower end thereof. A tubular member 90 extends outwardly from the hollow vertical member 76 adjacent the first straps, and serves to have hazardous waste treatment chemicals discharged outwardly therethrough.

Treatment of an impoundment P containing hazardous waste R is carried out by the apparatus A, which apparatus is illustrated as a crane in FIG. 1, in the following manner. The apparatus A is moved to land S adjacent an impoundment P as shown in FIG. 9 and the boom D extending outwardly over the impoundment to position the framework E thereover as illustrated in FIG. 10. The kelly stems J are concurrently rotated and the platform F lowered to allow the cutter-injectors M to move downwardly through the hazardous waste R at a station T, a series of which adjacent stations are shown in FIG. 10. Each of the cutter-injectors M as it rotates cuts and intermixes the waste R in a circular downwardly extending zone R-1 as shown in phantom line in FIG. 8. The adjacently disposed cutter-injectors M are of such transverse dimensions that the zones of one R-1 overlap one another as illustrated by phantom line in FIG. 8, and it is to these zones that the treatment chemicals are discharged.

The assembly K is used to discharge appropriate chemicals either dry, wet, or gaseous at a desired rate, to the cutter-injectors M, which discharge if desired may take place as the zones R-1 are formed to a desired depth.

The augers 88 allow a hard material to be penetrated as the cutter-injectors move downwardly through the waste R. The waste R that is mixed to a uniform consistancy in the zones R-1 remains in place therein, and due to the pitch of the straps 84 and 86 and the opposite rotation of adjacent cutter-injectors M the waste in one zone R-1 will be subjected to an upward force and the waste in an adjacent zone a downward force to obtain optimum intermixing of the waste. The discharging chemicals flow from the tubular member 90 as the cutter-injectors M rotate. After the zones R-1 have been formed the platform F is moved upwardly to cause the cutter-injectors M to rise through the zones R-1 with continued rotation of the cutter-injectors. If chemicals have not been injected into the waste R as the zones R-1 are formed, the chemicals are injected on the upward movement of the cutter-injectors M through the zones R-1. On occasion it may be desirable to inject chemicals into zones R-1 both as they are formed, and as the cutter-injectors are moved upwardly therethrough. Vapors, odors or omissions from the waste R that are not chemically destroyed during the formation of the zones R-1 and the injection of chemicals therein, are collected in the confined space within the end shroud 74 and discharged through a conventional scrubber U to be removed, after which air free of the objectionable omissions is caused to flow through a conduit 92 for discharge to the ambient atmosphere of a desired location.

Figure 11:
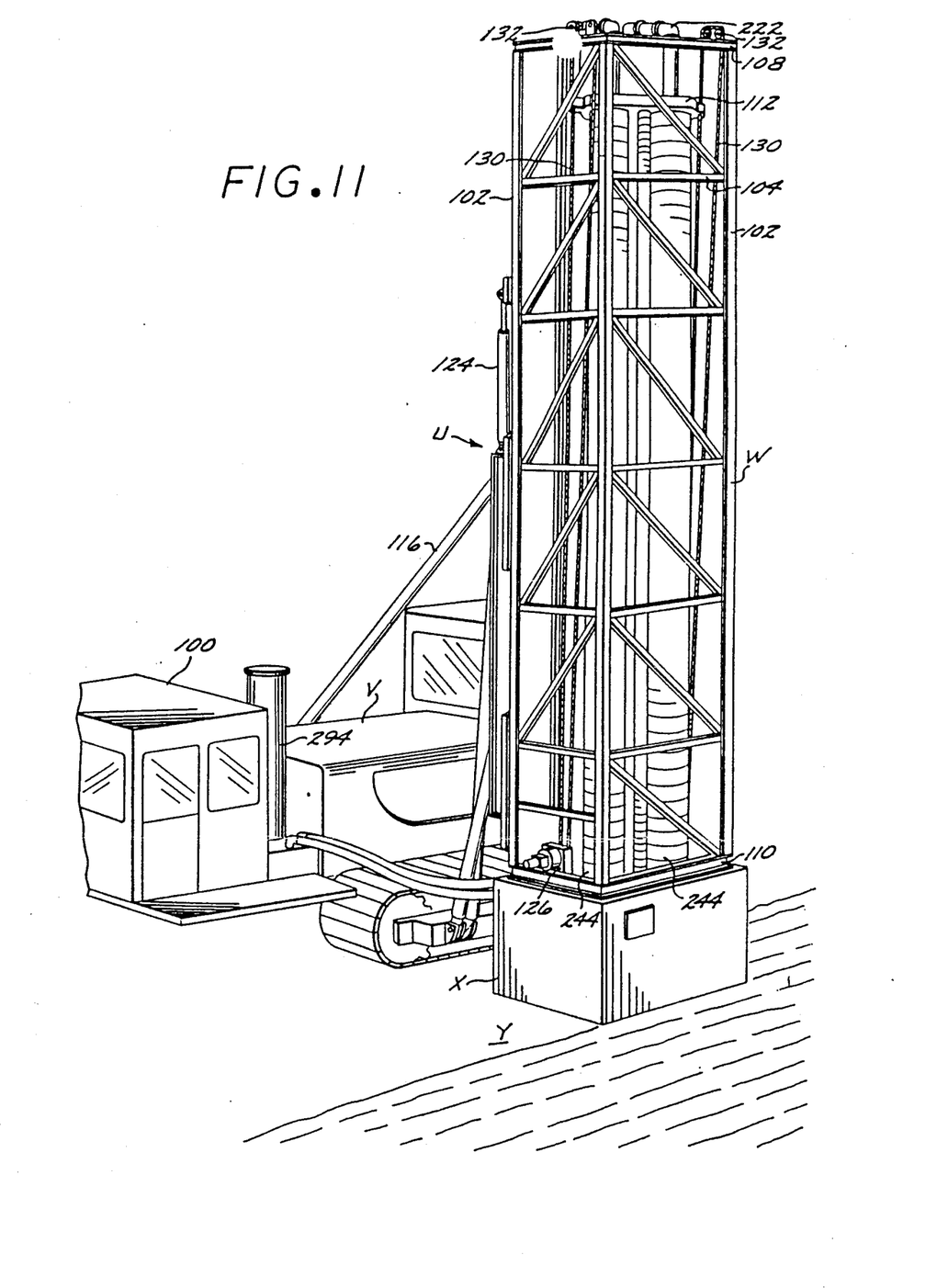
FIG. 11 is a perspective view of a second form of apparatus for use in the insitu treatment of hazardous waste impoundments.
Figure 12:
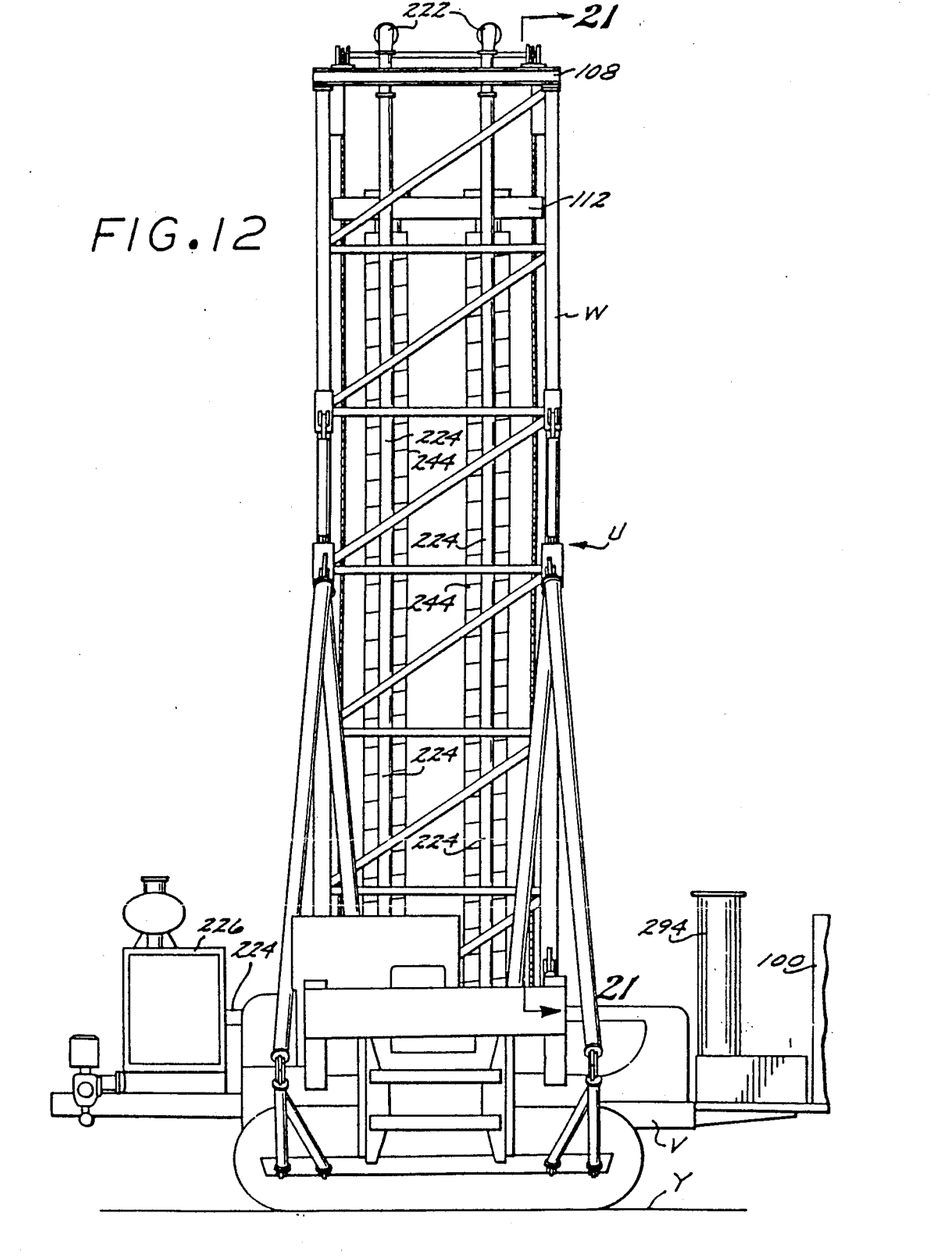
FIG. 12 is a side elevational view of the second form of apparatus.
Figures 13, 14:
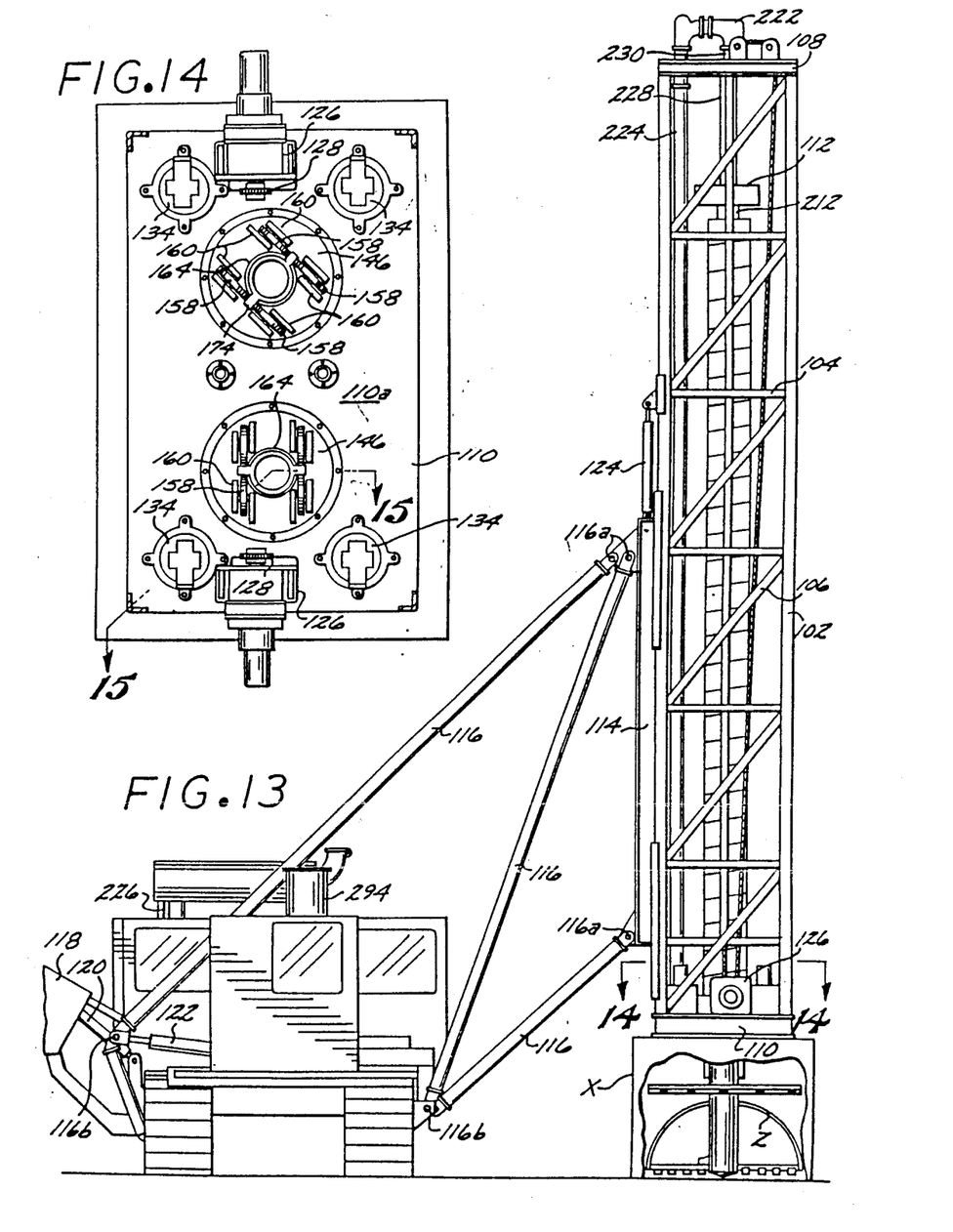
FIG. 13 is an end elevational view of the second form of apparatus.
FIG. 14 is a horizontal cross sectional view of a portion of the second form of apparatus taken on the line 14—14 of FIG. 13.

A second form of apparatus U is shown in FIGS. 11-13 that may be used in the detoxifying of a hazardous waste impoundment Y and is the best mode for accomplishing this result. Apparatus U includes a power operated vehicle V which in FIGS. 10-13 is illustrated as a caterpillar type tractor that movably supports a vertically extending frame W and an instrumentation and control cab 100. The frame W extends vertically and is of an open elongate shape. The frame W as shown in FIG. 11 is defined by four elongate corner members 102 between which cross pieces 104 and reinforcing member 106 extend. The frame W includes an upper platform 108 and lower platform 110 rigidly secured thereto. An intermediate platform 112 shown in FIG. 12 is situated within the frame W and is vertically movable relative thereto.

The frame W is vertically movable relative to a support assembly 114. The support assembly 114 has a number of elongate support members 116 extending therefrom to the vehicle V as shown in FIG. 13. The support members 116 at their outer ends are secured to support assembly 114 by pivotal connections 116a and to the vehicle V by pivotal connections 116b.

A counterweight 118 by a conventional linkage assembly 120 is movably supported from vehicle V on the side thereof opposite that from which frame W is supported. A first hydraulic cylinder assembly 122 is pivotally connected to the vehicle V and linkage assembly 120 to permit lateral movement of frame W and support assembly 114 relative to vehicle V when the hydraulic cylinder assembly is activated. A second hydraulic cylinder assembly 124 is pivotally connected to support assembly 114 and frame W to permit vertical movement of frame W relative to the support assembly 114 and vehicle V when the second hydraulic cylinder assembly is activated.

A confined space defining shroud X extends downwardly from lower platform 110 into which a power driven rotatable cutting blade Z is vertically movable. A laterally spaced pair of motors 126 are mounted on lower platform 110 and rotate drive sprockets 128. Each drive sprocket 128 engages an upwardly extending endless link belt 130 that rotatably engages a pair of sprockets 132 rotatably supported from upper platform 108. Intermediate platform 112 is secured by conventional fastening means 112a to a vertical reach 130a of belt 130.

Figures 20, 21, 22, 23, 24:
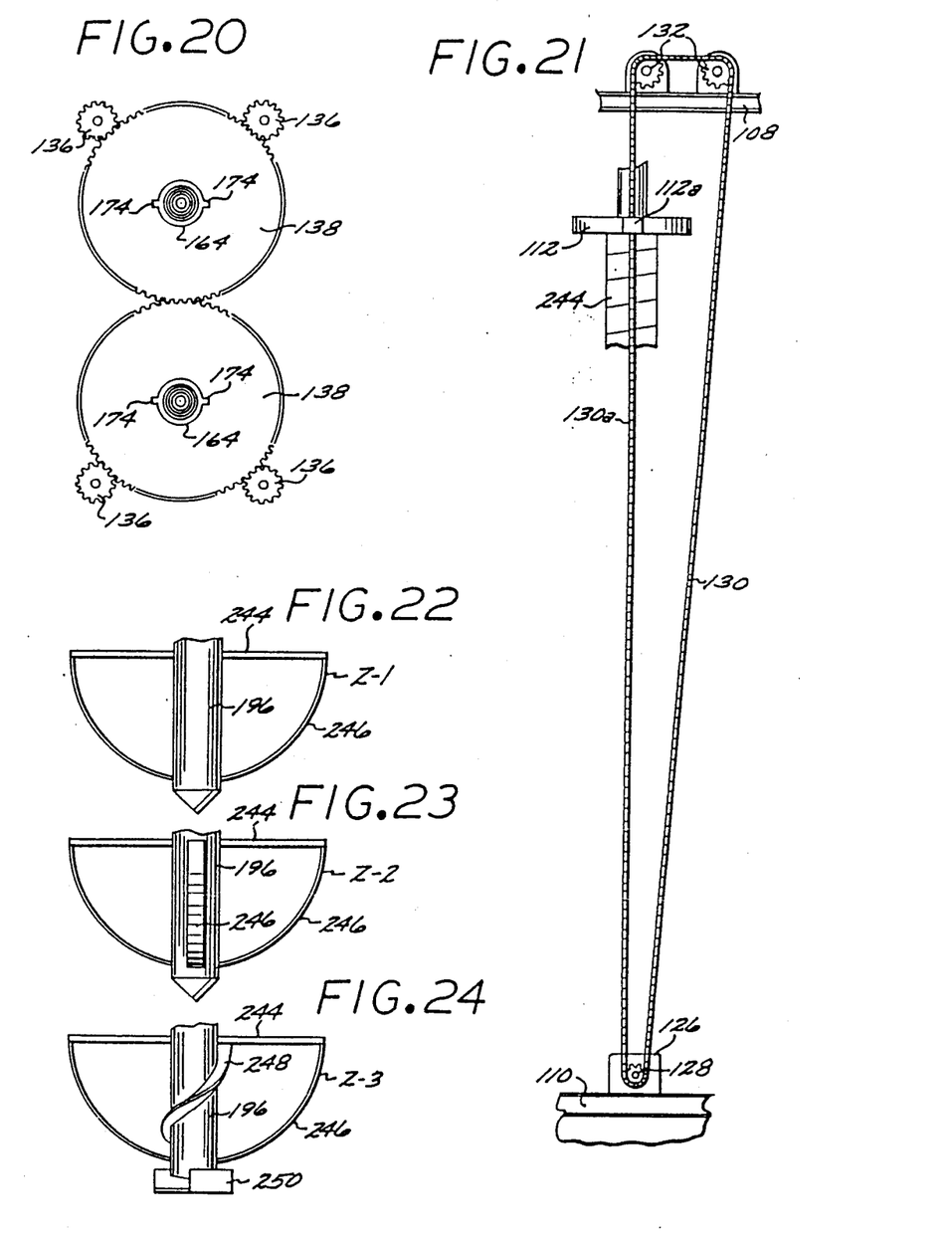
FIG. 20 is a diagrammatic view of the Kelly drive mechanism.
FIG. 21 is a side elevational view of the intermediate platform moving mechanism.
FIGS. 22, 23 and 24 are side elevational views of first, second and third forms of cutting blades.

The lower platform 110 has two pairs of electric motors 134 mounted thereon that rotate driving sprockets 136 as shown in FIGS. 14 and 20 that are in toothed engagement with a pair of driven gears 138, which gears are also in toothed engagement.

Figure 15:
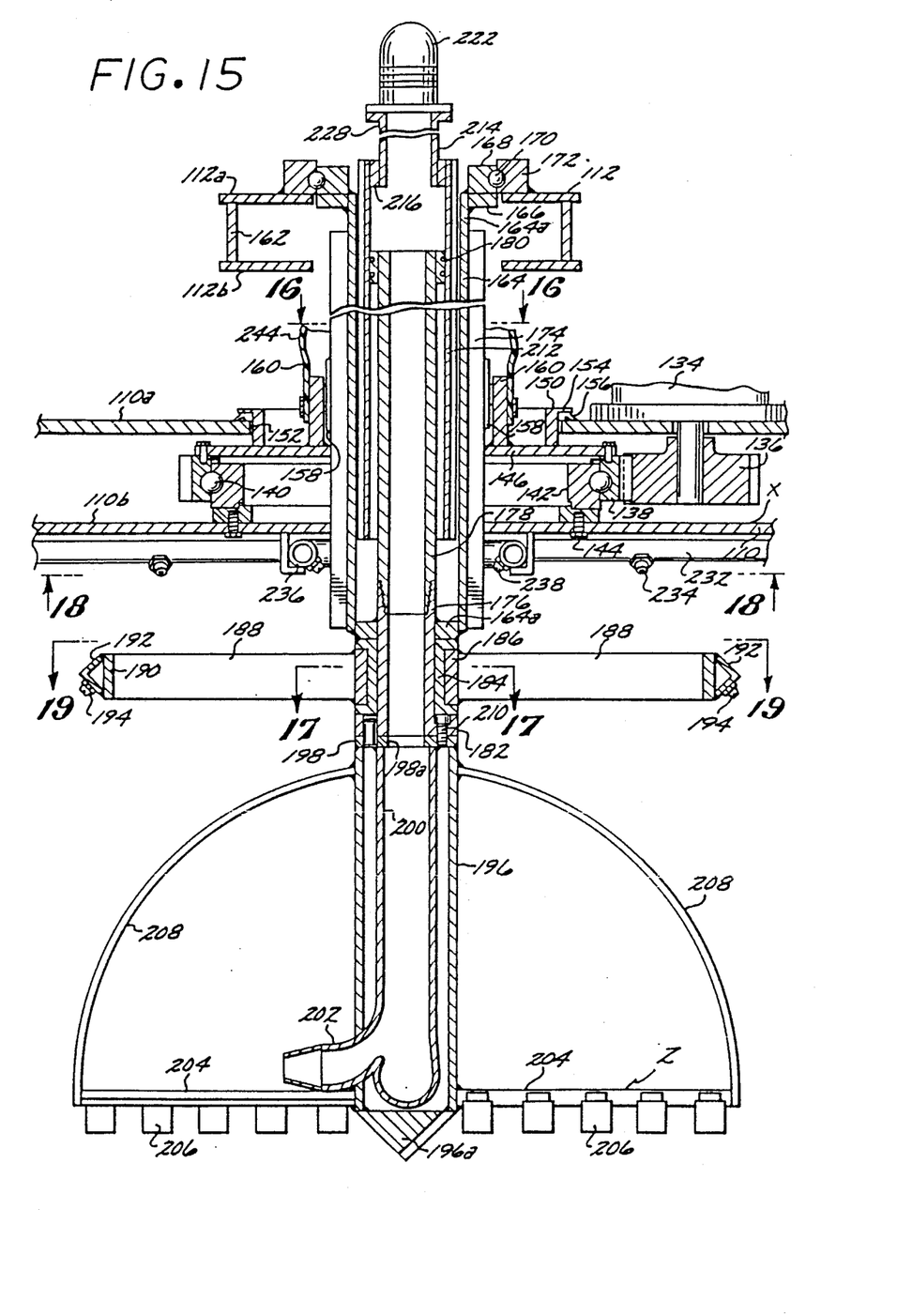
FIG. 15 is a fragmentary vertical cross sectional view of the second form of apparatus taken on the line 15—15 of FIG. 14.

The lower platform 110 as may be seen in FIG. 15 is defined by an upper horizontal plate 110a and lower plate 110b. Each gear 138 is ring shaped and is rotatably supported by a sequence of ball bearings 140 from a ring shaped mounting assembly 142 that is secured to lower plate 110b by bolts 144 as shown in FIG. 15.

Each driven gear 138 has a flat rigid ring shaped member 146 secured to the upper surface thereof by bolts 148 as shown in FIG. 15. Each member 146 has a cylindrical sleeve 150 projecting upwardly therefrom and passing through an opening 152 in upper plate 110a. In FIG. 15 it will be seen that each sleeve 150 has a flange 154 projecting outwardly therefrom that supports a seal 156 in sliding contact with the upper surface of upper plate 110a.

Figure 16:
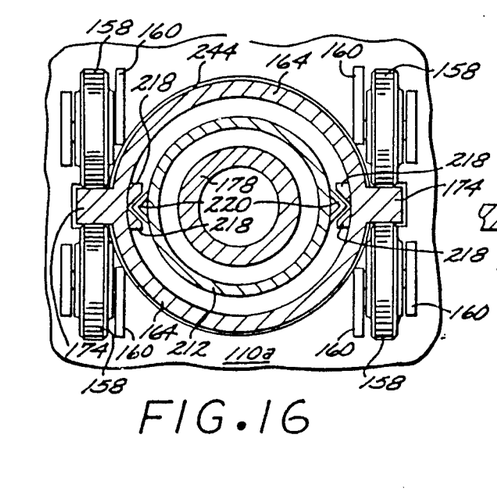
FIG. 16 is a horizontal cross sectional view of a portion of the second form of apparatus taken on the line 16—16 of FIG. 15.
Figure 17:
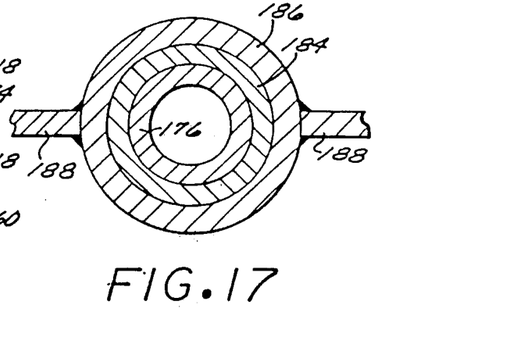
FIG. 17 is a horizontal cross sectional view of a portion of the second form of apparatus taken on the line 17—17 of FIG. 15.

In FIGS. 14 and 16 it will be seen that two spaces pairs of rollers 158 are rotatably supported above upper plate 110a from lugs 160 that are secured to members 146.

The intermediate platform 112 as may be seen in FIG. 15 is defined by upper and lower vertically spaced rigid ring shaped horizontal plates 112a and 112b that are joined by connectors 162. Two tubular Kellys 164 used in driving blades Z have upper end portions 164a disposed within intermediate platform 112. Each end portion 164a has an outwardly extending flange 166 secured thereto, which flange has an externally grooved ring shaped member 168 secured thereto that rotatably engages a sequence of ball bearings 170 that engage an internally grooved ring shaped member 172 secured to the upper plate 112a of intermediate platform 112.

Kelly 164 has two oppositely disposed vertically extending ribs 174 projecting outwardly from the external surface thereof as shown in FIG. 16, which ribs are rotatably engaged by the two pairs of rollers 158. Kelly 164 has a horizontal member 164a secured to the lower end thereof that supports a centrally disposed tubular member 176 of substantially smaller diameter than that of Kelly 164. Tubular member 176 serves as a mounting for a tube 178 that extends upwardly in Kelly 164, which tube has an outwardly extending seal 180 on the upper end thereof. The lower end of tubular member 176 develops into an outwardly extending flange 182.

Tubular member 176 rotatably supports a bushing 184 between member 164a and flange 182. The two bushings 184 rotatably engage cylindrical shells 186 that are connected by arms 188 of an open rectangular frame 190. The frame 190 on the periphery thereof supports a conduit 192 that has spray heads 194 mounted thereon, the purpose of which will later be explained.

Cutting blade Z illustrated in FIG. 15 includes an outer tube 196 that has a pointed lower end 196a and the upper end of the tube being secured to a circular plate 198 that has a centered opening 198a therein. An inner tube 200 is secured to plate 198 and is in communication with opening 198. Inner tube 200 on the lower end develops into a discharge nozzle 202 that extends through outer tube 196.

Two oppositely disposed cutting blades 204 extend outwardly from the lower end of outer tube 196 and support a number of spaced teeth 206. Two arcuate cutting members 208 extend upwardly from the outer ends of blades 204 to outer tube 196 as shown in FIG. 15. Circular plate 198 is secured to flange 182 by conventional means such as bolts 210 or the like.

The seal 180 engages the interior surface of an intermediately positional tube 212 that extends downwardly between Kelly 164 and inner tube 178. A tube extension 214 projects upwardly from tube 212 and is secured thereto by a ring shaped end piece 216 as shown in FIG. 15. In FIG. 16 it will be seen that Kelly 164 has two groove defining ribs 218 on the interior thereof that slidably engage to the exterior surface of tube 212.

Two inverted U-shaped tubular fittings 222 are mounted on upper platform 108 and are supplied air under pressure from two pipes 224 that are in communication with an air blower assembly 226 mounted on vehicle V as illustrated in FIG. 12. Two pipes 228 extend downwardly from fittings 222 to two tubular swivels 230, with the lower ends of the swivels connected to the tube extensions 212 as shown in FIG. 13.

Figure 18:
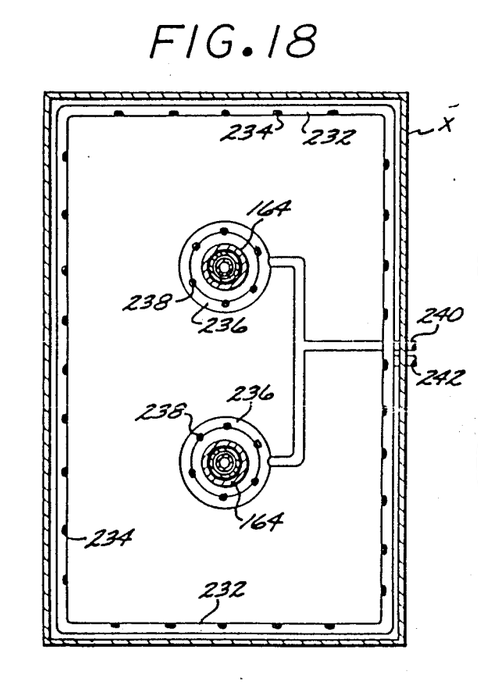
FIG. 18 is a bottom plan view of a portion of the second form of apparatus taken on the line 18—18 of FIG. 15.
Figure 19:
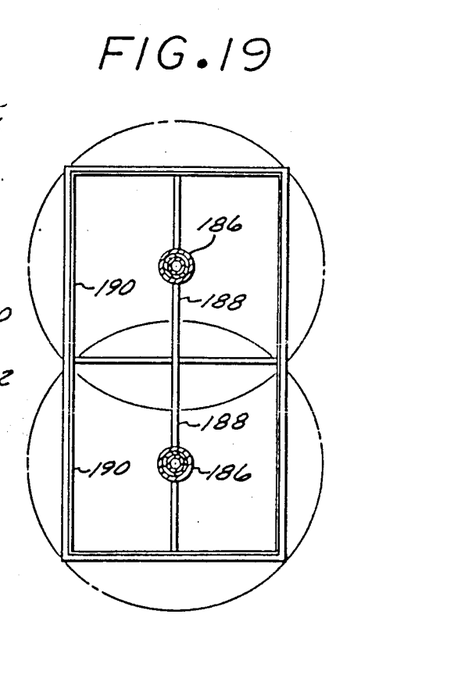
FIG. 19 is a top plan view of a portion of the second form of apparatus taken on the line 19—19 of FIG. 15.

In FIGS. 15 and 18 it will be seen that a tubular rectangular frame 232 is supported from the underside of lower plate 110b within shroud X and has spray nozzles 234 extending outwardly therefrom. Circular tubes 236 are supported from lower plate 110b and extend around Kellys 164 and support nozzles 238. Liquid under pressure is supplied to tubular frame 232 by a pipe 240 and to circular tubes 236 by a pipe 242. The liquid supplied to tubular frame 232 and circular tubes may be water to not only form sprays to scrub gases from the air in shroud X, but also to wash toxic material from Kellys as the detoxification of impoundment Y proceeds. Toxic gases that arise during the detoxificaton of impoundment Y are prevented from escaping upwardly around Kellys 164 by tubular bellows 244 that envelop the Kellys. The lower end of the bellows 244 are secured to lugs 160 by conventional means and the upper ends of the bellows to the lower surface of intermediate platform 112.

Prior to using the apparatus U it is desirable that an underground radar scan be made of the hazardous waste impoundment to locate buried drums, tanks, barrels, and the like that may contain extremely dangerous materials. Suitable precautions must be taken when detoxifying the portions of the impoundment Y adjacent thereto.

Figure 25:
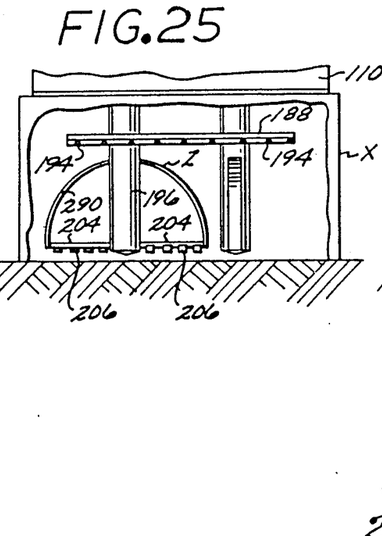
FIG. 25 is a front elevational view of the interior of the shroud in which spray water and liquid reagents are discharged to remove toxic gases from air prior to discharge to the ambient atmosphere.

After obtaining the above information, as well as an analysis of a sample of the hazardous waste impoundment Y to obtain the composition thereof, the apparatus U is moved to a first station as shown in FIG. 25 adjacent the impoundment and the frame W moved to dispose the shroud X in sealing contact with the upper surface of impoundment Y.

The motors 134 are now caused to drive the members 146 with the rollers 158 exerting a rotational force on the ribs 174 to rotate Kellys 164 and the cutting blade Z. Motors 126 are now energized to drive belts 130 to move intermediate platform 112 downwardly to exert a downward force on Kellys 164. Rotation of Kelly 164 is accompanied by the concurrent rotation of tubes 176, 178, 212, and 200, and pressurized air may now be discharged downwardly there through from blower assembly 226 to exit through nozzle 202.

Figure 26:
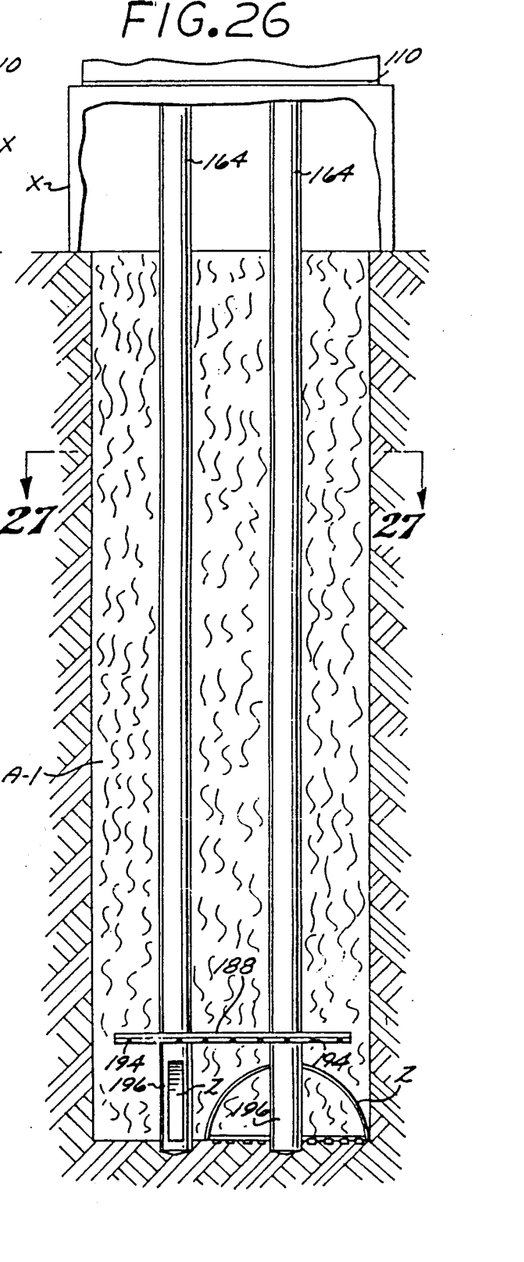
FIG. 26 illustrates the forming of a downwardly extending zone of hazardous waste into a particled form.
Figure 27:
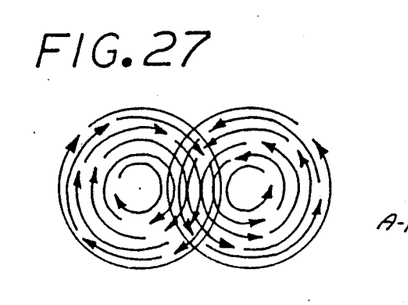
FIG. 27 illustrates the overlapping counter rotation action of a pair of adjacently disposed power driven blades.

Operation of the apparatus U results in the forming of a downwardly extending zone A-1 of particled hazardous waste impoundment material as shown in FIG. 26. If the detoxifying agent is a dry powdered material it is introduced into the air stream from blower assembly 226 to discharge from nozzle 202. As the forming of zone A-1 takes place a pressurized liquid is discharged from the nozzles 194 to assist cutting blade Z in forming zone A-1 and reducing the size of the particles. Discharge of liquid from nozzles 194 causes the formation of a layer of turbulent liquid and particles above the blade Z which acts as a vertically movable seal to minimize the upward flow of toxic gases in zone A-1 into the interior of shroud X, and toxic gases below the seal being detoxified by the detoxifying agent.

Toxic gases that flow upwardly into the shroud X are scrubbed therefrom by a series of liquid spray from nozzles 234 and 238, prior to air from shroud X being discharged to the ambient atmosphere. The liquid serving as the scrubbing agent flows downwardly into zone A-1 and is detoxified therein. Toxic gases from zone A-1 are prevented from flowing upwardly around Kelly 164 to the ambient atmosphere, due to the portion of the Kelly above the lower platform being encased in the longitudinally movable bellows 224. After the detoxifying method has been performed at a first station the apparatus U is returned to its initial position and subsequently moved to a sequence of second stations where the above described method is repeated.

Although the method has been described with the use of pressurized air to displace toxic gases from the particled material in zone A-1., steam may be used for this purpose. Use of steam is desirable when the hazardous waste contains substantial quantities of volatile organic components. The pair of concurrently rotating blades Z do not interfere with one another due to the gears 138 being in toothed engagement as shown n FIG. 20.

The rotating blades Z particle the hazardous material in zone A-1 without the particled material being appreciably discharged upwardly therefrom. First, second and third alternate forms of blades Z-1, Z-2 and Z-3 are shown in FIGS. 22, 23 and 24, each of which includes a pair of oppositely disposed arms 244 secured to outer tube 196 and have arcuate cutting blades 244 extending downwardly therefrom to the outer tube. The third alternate form Z-3 includes a special cutting member 248 and teeth 250 secured to outer tube 196.

Instead of using a chemical detoxifying agent, the apparatus U may be used to introduce microorganisms into the zone A-1 to detoxify the latter. The microorganisms are either those already present in the impoundment Y or microorganisms that have been genetically engineered to biodegrade the hazardous material. The introduction of the microorganisms is accompanied with a liquid nutrient therefor.

Figure 28:
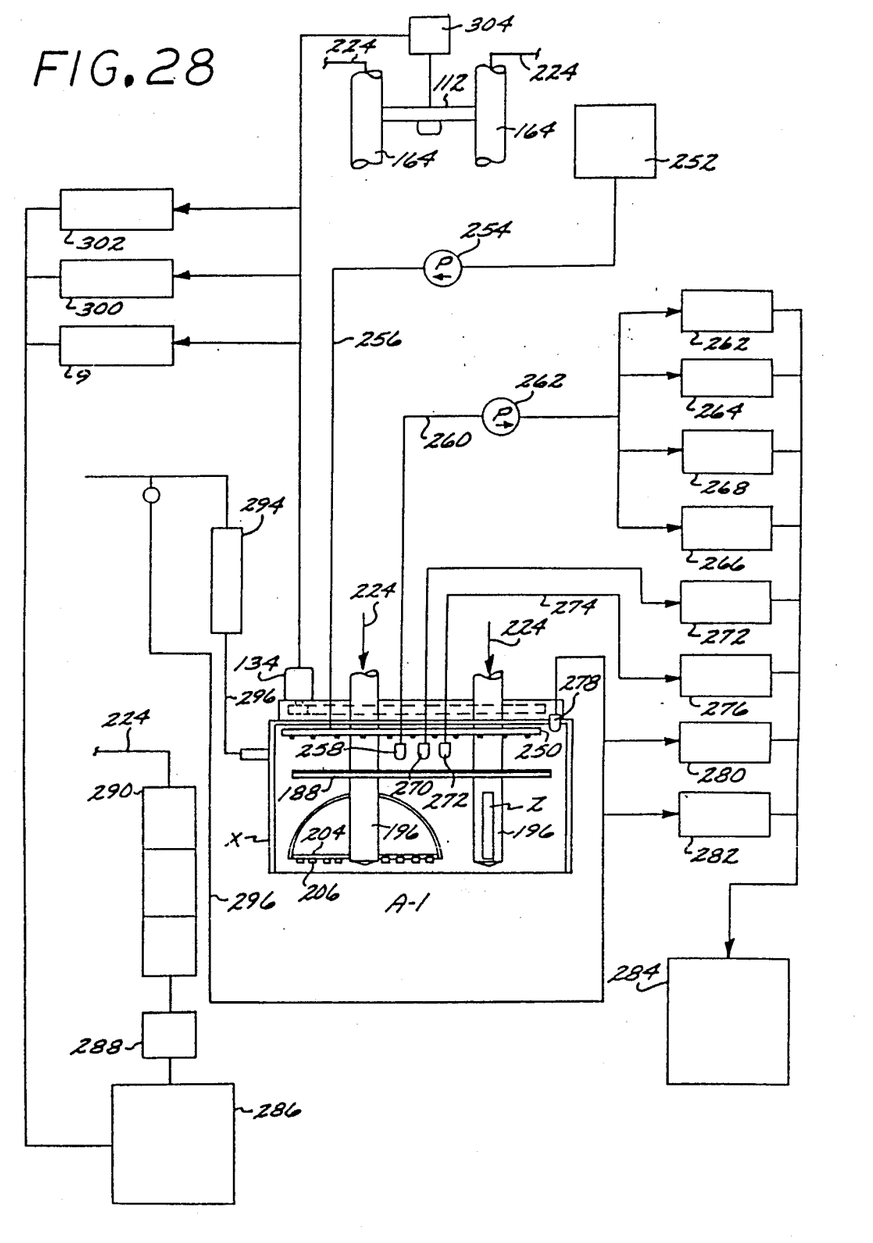
FIG. 28 is a diagrammatic layout of the sensing equipment used in the computer controlled insitu treatment of hazardous waste impoundments.

An assembly is shown diagrammatically in FIG. 28 that permits the composition of the hazardous waste impoundment to be determined as the zones A-1 are formed and the amount of detoxifying agent necessary to treat the same being determined by a computer system. A frame 248 is supported from tubes 196 above cutting blades Z, which frame supports a jetting assembly 250.

A liquid wetting reagent or dionized water from a storage tank 252 is fed by pump 254 through line 256 into flushing jet assembly 250 as shown in FIG. 28. The jetting assembly 256 erodes or displaces or washes the contaminated waste, causing the wash water to surround the sampling device and probes later to be described mounted on frame 244. The wash water containing waste contaminants can be sampled or be in contact with the probes at any preprogrammed depth of the zone A-1.

The sampling device shown as 258 picks up the flushed water and removing such water through line 260, the water pick-up is achieved by vacuum pump 262 and routed to the receiving chambers of an ICP Spectrometer or such suitable equipment shown as 262, for the screening of such toxic elements as heavy metals; to a radiation detector or such suitable equipment shown as 264 for the screening of radioactive substances; to a reactivity and conductivity analyser shown as 266 for screening the sampled water for such properties; to a biological analyser or such suitable equipment shown as 268 to characterize the biological properties therein or to preprep such samples for traditional laboratory analysis.

The pH and Oxidation Reduction Potential (ORP) probe shown as 270 signals the pH and ORP of the wash water and transmits such signals to the pH and ORP meter shown as 272.

The temperature and moisture content probe shown as 272 transmits signals through cable 274 to temperature and moisture meter shown as 276.

Gases or vapors that may be released from the subsurface contents during mixing and homogenization are collected in shroud X, such liberated gases or vapors are collected by sensor 278 mounted on the shroud X. Such gases are routed to the photoionization detector or similar equipment and are screened for a wide range of chemical organic compounds, volatiles, and explosive vapors.

The photoionization detector or suitable similar equipment is shown as 280.

Sensor 278 also directs gases and vapors from zone A-1 to Sulfur Dioxide and Hydrogen Sulfide Detector shown as 282 measuring the concentration levels of those elements.

The data acquired from the ICP Spectrometer 262; The Radiation Detector 264; the Reactivity and conductivity analyzer 266; the Biological Analyzer 268; the pH and ORP meter 272; the Temperature and moisture meter 274; the Photoionization detector 280 and the Sulfur Dioxide and Hydrogen Sulfide Detector 282 are signaled to the data scan and interface analyzer and controller 284, then routed to the treatment menu programmer interface system 286 which determines the specific treatment parameter and treatment media dosage rate trigerring feeder shown as 288, for the programmed feeding of the treatment media from the pneumatic chemical tanks shown as 290, such treatment media may include chemical reagents, bacteria, bacteria nutrients and oxygen generating chemicals. The selected treatment media is then fed into the Kellys 164 through top thereof as shown by line 224, for the integration with the subsurface waste. During the treatment stages all data aquisition systems earlier described are used where specifically needed for the characterization of the chemically or biologically improved subsurface contents. Gases and emissions are released from shroud X to scrubber 294 through a line 296.

The data acquisition and analyzer equipment are not limited to those described above, and equipment or analyzers similar in function or purpose may be incorporated, since contaminants present in hazardous waste sites are not typical but in general can be found to be highly variable and complex.

During the scrubbing of liberated gases or vapors by scrubber 294, the released and scrubbed emissions are routed through bypass shown at 296 to the photoionization detector 280 or Sulfur Dioxide and Hydrogen Sulfide detector shown as 282 to determine released compliance, or by pass 296 may be connected to an emission analyzer and the results of such data signalled to the data scan shown as 284.

The plasticity meter shown as 298 acquires placticity or density of the contents of zone A-1 from the alternating power-load of the Kelly drive motors 134. Such data characterizes the completion of the solidification of the subsurface contents if the preferred treatment of the waste contents require solidification thereof. The RPM meter shown as 300 acquires such data from the Kelly drive motors 134. The vertical travel depth and speed of blades Z is screened by scanner 302, acquiring such data from a vertical travel monitor shown at 304.

All acquired data from the Plasticity Meter 298, RPM meter 300 and Vertical Travel devices 302 and 304 are signalled to the Treatment Program Interface System 286 for incorporation into the preferred treatment of the hazardous material in zone A-1.

Figure 29:
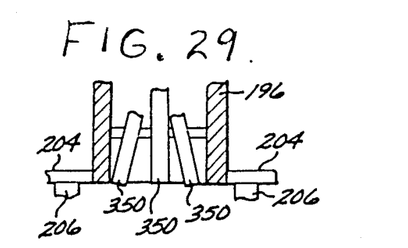
FIG. 29 is a diagrammatic view of the lower end of a tubular Kelly that supports a number of plasma torches that provide sufficient heat to transform zone A-1 to a vitrified mass.

In addition to the detoxifications previously described, the apparatus U may be used to vitrify zone A-1 if the same is of a sandy or clay composition. Such vitrification is accomplished by the use of plasma torches 350 held in the lower ends of tubes 196 by supports 352 as shown in FIG. 29. After the zone A-1 has been particled by use of blades Z, the blades are moved upwardly therein and the material therebelow is subjected to plasma arcs to melt and subsequently cool to a vitrified, nonsoluble, rigid mass. In the event the hazardous waste in zone A-1 does not contain sufficient sand or clay to vitrify, sand, clay or other vitrifiable material is added thereto through Kellys 164 by an air stream during the forming of the hazardous waste into particles. The use and operation of the invention has been described previously in detail and need not be repeated.

Persons skilled in the art will readily appreciate that various modifications can be made from the preferred embodiment thus the scope of protection is intended to be defined only by the limitations of the appended claims.

I claim:

1. An in situ method of treating hazardous waste in a disposal site having hazardous waste randomly distributed therein comprising the steps of:
    (a) agitating a downwardly extending zone of particles of said hazardous waste at a first station on said site;
    (b) maintaining said zone out of communication with the ambient atmosphere;
    (c) analyzing vapors and gases which are liberated from said zone during said agitating to determine the identity of the toxic components therein;
    (d) separating toxic gases and vapors identified by said sampling from said particles in said zone;
    (e) detoxifying said separated toxic gases and vapors;
    (f) injecting at least one treatment agent selected in accordance with the determined identity of the toxic components into said particles in said agitating zone;
    (g) terminating said method when said sampling indicates said particles have been treated to a desired degree; and
    (h) repeating said method at a second station at said disposal site that overlaps said first section.

2. The method of claim 1, wherein said agitating step comprises rotating a plurality of adjacently disposed cutters downwardly through said zone.

3. The method of claim 2, wherein said cutters include a pair of oppositely pitched blades to impart a downward and upward screwing action to said hazardous waste to obtain optimum homogenization thereof.

4. The method of claim 1, 2 or 3, wherein said treating step comprises injecting an agent into said zone to render water soluble toxic compounds therein insoluble.

5. The method of claim 4, further comprising the step of selecting a detoxifying agent that is effective in detoxifying particles of the composition found in the sample.

6. The method of claim 5, wherein said agent is selected from the group consisting of calcium oxide, sodium bisulfate and sodium hydrosulfite.

7. The method of claim 5, further comprising the step of establishing a pH of from 8.0 to 11.0 in said zone to facilitate the oxidizing of soluble salts of toxic metals therein to a substantially insoluble state.

8. The method of claim 5, wherein an agent is injected into said zone to interact with water therein and to provide an exothermic reaction in which radioactive products in said zone are transformed to a solid water insoluble mass.

9. The method of claim 8, wherein a plurality of said zones are arranged to provide an insoluble liner around the periphery and under said waste disposal site.

10. The method of claim 5, wherein said treating step comprises saponifying waste hydrocarbon products in said zone to an insoluble mass and oxidizing soluble salts of toxic metals present in said zone to a substantially insoluble state, collecting gases from said saponifying and oxidizing in a confined space, and scrubbing said gases in said confined space.

11. The method of claim 5, wherein said treating step comprises discharging a liquid media of microorganisms and a nutrient therefor into said zone, said microorganisms being of a species that biodegrades toxic substances in said zone to nontoxic material that remains in place in said zone.

12. The method of claim 1, 2 or 3 wherein said treating step comprises subjecting said particles in said zone to the action of at least one plasma arc to define a solid, vitrified, insoluble mass of substantial strength.

13. The method of claim 12, wherein a plurality of said zones are arranged to provide an insoluble liner around the periphery and under said waste disposal site.

14. The method of claim 4, wherein said treating step comprises discharging a plurality of liquid jets into said zone to further reduce said particles in size and provide a liquid seal that minimizes the flow of toxic gas from said zone.

15. The method of claim 5, in which said hazardous waste may contain radium 226 and thorium 230 from which radon is emitted due to radioactive decay, with said agent being added in an amount sufficient to precipitate said radium and thorium to transform them and said hazardous waste into a solid, inert insoluble mass of such high density that the rate of migration of radon therethrough is slowed to the extent that the major portion of the radon transforms to a solid radionuclide element prior to reaching the ambient atmosphere to contaminate the latter, with waste radionuclide element being rendered insoluble by contact with said agent and remaining in place in said insoluble mass.

16. The method of claim 1 further comprising the step of:
    injecting pressurized fluid into the agitating volume of soil.

17. The method of claim 16, wherein said pressurized fluid is heated.

18. The method of claim 17, wherein said pressurized fluid is steam.

19. The method of claim 17, wherein said pressurized fluid is hot air.

20. The method of claim 17, wherein said volume of soil is agitated by a rotary cutter and said pressurized fluid is injected into said volume of soil near the lower end of the volume of agitating soil.

21. The method of claim 17, wherein said volatile gases are captured in a shroud and further comprising the step of maintaining said shroud in sealing contact with the soil surface during said method to prevent escape to atmosphere of said gases collected in said shroud.

22. The method of claim 21, wherein said gases are scrubbed with wash liquid and contaminant-laden wash liquid is conducted to automatic equipment for determining selected contaminants in said wash liquid and selected physical properties thereof and generating computer-usable data representative of said properties.

23. The method of claim 22 comprising the further steps of: routing said acquired data to a treatment menu programmer interface; determining therein the amount of detoxifying agent necessary to treat the detected contaminants; and generating therein a signal which triggers a feeder for the programmed feeding of selected detoxifying agent to detoxify the soil in situ.

24. The method of claim 23, comprising the further steps of: using motor driven rotary cutter means to agitate the soil; collecting information signals representative of the power load of the cutter drive motor and vertical travel distance of the cutter means; passing said signals to said treatment menu programmer; and using said information signals to determine preferred treatment of contaminated soil.

* * * * *